United States Patent [19]

Klaffke et al.

[11] 4,137,575
[45] Feb. 6, 1979

[54] SWIMMING POOL TARPAULIN

[75] Inventors: Friedemann Klaffke, Gorxheimertal; Klaus Heckel, Weinheim, Bergstr., both of Fed. Rep. of Germany

[73] Assignee: Firma Carl Freudenberg, Weinheim, Bergstr., Fed. Rep. of Germany

[21] Appl. No.: 809,885

[22] Filed: Jun. 24, 1977

[30] Foreign Application Priority Data

Jul. 10, 1976 [DE] Fed. Rep. of Germany ... 7621892[U]

[51] Int. Cl.² .............................................. E04H 3/19
[52] U.S. Cl. ................................................. 4/172.12
[58] Field of Search ................... 4/172.12, 172.14, 172; 9/8 R

[56] References Cited

U.S. PATENT DOCUMENTS

| 2,870,455 | 1/1959 | Reeves | 4/172.12 |
| 3,011,930 | 12/1961 | Dworak | 4/172.12 |
| 3,072,920 | 1/1963 | Yellott | 4/172.12 |
| 3,667,070 | 6/1972 | Pitti et al. | 4/172.12 |
| 3,872,522 | 3/1975 | Bennett et al. | 4/172.12 |

Primary Examiner—Richard E. Aegerter
Assistant Examiner—L. Footland
Attorney, Agent, or Firm—Sprung, Felfe, Horn, Lynch & Kramer

[57] ABSTRACT

A tarpaulin with thermal insulation for a swimming pool, comprising a closed-cellularly foamed, elastic plastic foil with flotation features, wherein the top side thereof is lined with a porous material and the reverse side with an impenetrable, flexible surface structure having a relief-like surface.

2 Claims, 3 Drawing Figures

SWIMMING POOL TARPAULIN

BACKGROUND OF THE INVENTION

The present invention relates to a tarpaulin with thermal insulation for a swimming pool, consisting of a closed-clelularly foamed, elastic plastic foil with flotation features.

Tarpaulins of this type are used on swimming pools in order to prevent heat loss of the water and at the same time to prevent pollution of the latter due to algae growth and flying dust. Such tarpaulins have been used widely especially on private swimming pools which are not used routinely and which are frequently equipped only with makeshift water treatment facilities.

German Utility Pat. No. 7,527,184 shows a tarpaulin of this type which consists of a cross-linked polyolefin foil foamed with closed cells, and on the top side of which a fiber-reinforced cover foil is affixed. Initially, the tarpaulins have proved excellent, however, after extended use it has proved in the meantime that their great function value is yet open to improvement.

Older swimming pools frequently do not have a rolling-up device for the swimming pool tarpaulin, and in these cases the cover must be pulled off the water surface by hand; a process which for instance children should be able to perform. A constant, low weight is therefore of great importance, and in the case of the known tarpaulin considerable difficulties arose especially in regard to this point. Apparently due to diffusion processes, water concentration within the closed cells of the foam material developed so that their weight per unit area could increase by ten to fifteen times in extreme cases. A decrease of thermal insulation developed parallel to this weight increase.

It is considered an additional disadvantage that the soft-elastic construction of the underneath of the tarpaulin was a considerable hindrance particularly when pulling it over sharp edges of the pool; moreover, the underneath of the tarpaulin could be damaged.

SUMMARY OF THE INVENTION

The main object of the present invention is to provide a swimming pool tarpaulin which, while retaining the known advantages of the older embodiment, avoids the aforementioned disadvantages and which, in addition, is especially attractively designed.

This and other objects have been achieved by the tarpaulin of the present invention having the top side of an elastic plastic foil, foamed with closed cells, and lined with porous material, and its reverse side with an impenetrable, flexible surface structure, which, if desired, can be structured relief-like.

A special embodiment provides that the top side is lined with a material of natural or synthetic fibers and that the reverse side is lined with an unfoamed foil. It is of particular advantage here if a ribbon weave is affixed to the top side consisting of a polyolefin, such as for instance polypropylene or polyethylene. A particularly suitable lining for the reverse side proved to be a foil made of an unfoamed polyolefin, especially a polyethylene foil.

The particularly advantageous features of the present invention result from the fact that because of the cover foil, which is affixed to the reverse side, the diffusing in of water into the closed-cell foam web is made extremely difficult, while the unavoidable amounts which do penetrate are evaporated without great difficulties either by the sun or by the temperature difference which generally exists between the pool water and the surroundings. Swimming pool tarpaulins of this novel type distinguish themselves therefore particularly by a rather constant weight per unit area. It is in this connection surprisingly almost of no importance if the porous surface itself is occasionally flooded by water, for instance by rain. One must merely make sure that such water does not remain on the tarpaulin permanently and this can be avoided very easily, for example, by providing water drainage holes spaced at large intervals.

The novel swimming pool tarpaulin exhibits especially high initial and subsequent tearing strengths when coated with a ribbon weave of polyethylene, and, if desired, it can also be pulled tight by using riveting loops. Further advantages are the use of polyethylene for the surface coating, insofar as this material, equipped accordingly with negligible minor water absorption capability, exhibits high resistance to light and discoloration so that the attractive appearance of the novel tarpaulin is hardly impaired even after lengthy use.

The purpose of structuring the cover foil, which forms the reverse side, in a honeycomb-type pattern is to facilitate the pulling-off of the tarpaulin from the water surface and to simultaneously facilitate its rolling up into a tight diameter without breaks. Adapting to a modified objective, for example to reducing the contact area of the tarpaulin with the water surface, it is, aside from this, also preferable to perhaps provide the underside of the tarpaulin with a different relief structure with enlarged cavities which could be considered an additional improvement of heat insulation.

DETAILED DESCRIPTION OF THE INVENTION

Figure 1:
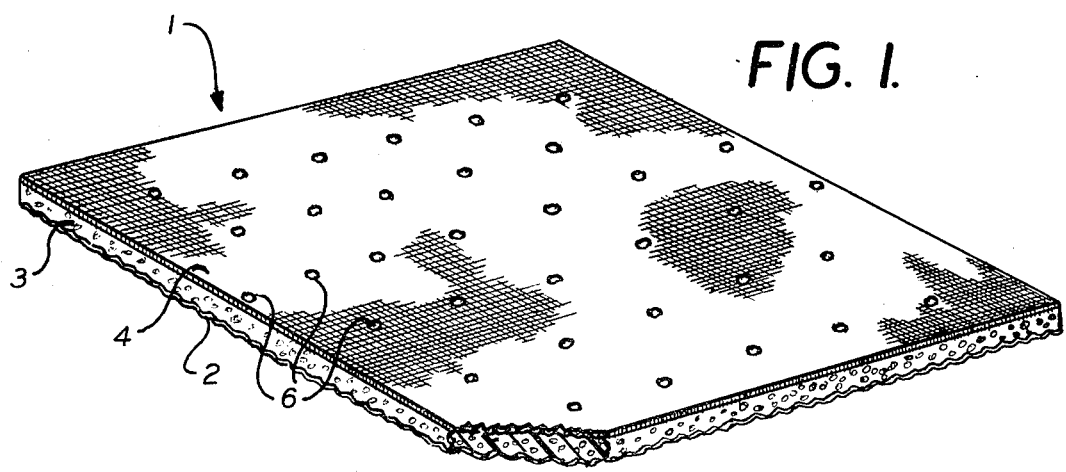
FIG. 1 is a cutaway perspective view of the tarpaulin of the present invention.
Figure 2:
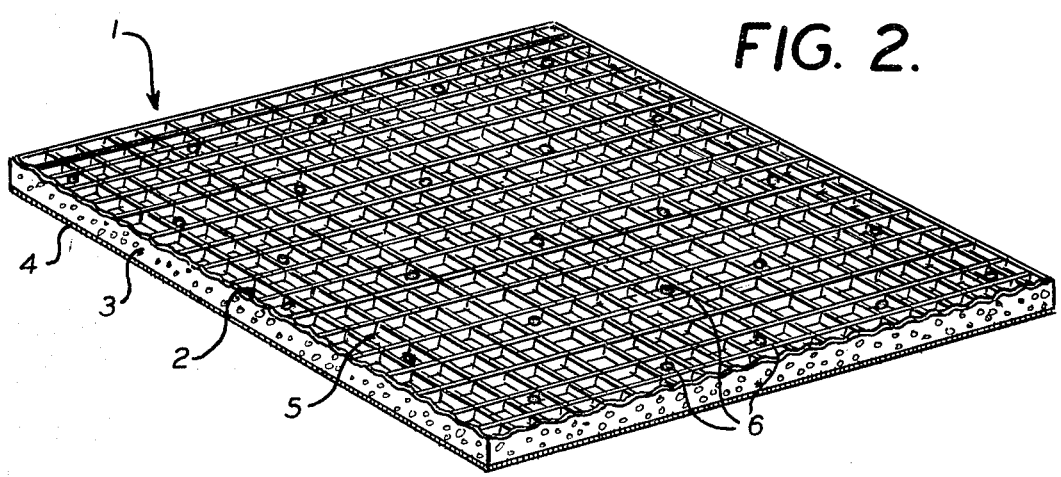
FIG. 2 is a view of the underside of the tarpaulin of FIG. 1.

FIGS. 1 and 2 show an embodiment of the covering 1 for swimming pools.

The under foil 2 of the covering consists of a polyolefin band preferably a polyethylene band with a thickness of 30–100$\mu$ preferably 50$\mu$.

It is bonded or welded with the centrally arranged foam material band 3, for this connection, preferably a flame lamination method is applied. Together with a pressure roller with a structured surface, by means of a suitable method, the under foil 2, can at the same time be provided with a wafer-like embossment 5.

The foam material band 3 consists of a closed-cell foamed, crosslinked polyethylene foam with a thickness of 3–15 mm, preferably 7 mm, with the diameter of the cells varying in the range of 0.2–1 mm.

The covering material 4 is a band web or weave consisting of polyethylene with a weight per unit area of 70–150 g/m$^2$, the width of the individual bands is 1–4 mm, preferably 2 mm.

The covering web 4, is also connectable with the foam material band 3 by means of a flame lamination procedure.

The openings 6, for the passage of rain, which transverse the entire structure are distributed according to the individual taste on the whole surface, the distance from each other can vary in a range of 10 cm to 2 m.

Figure 3:
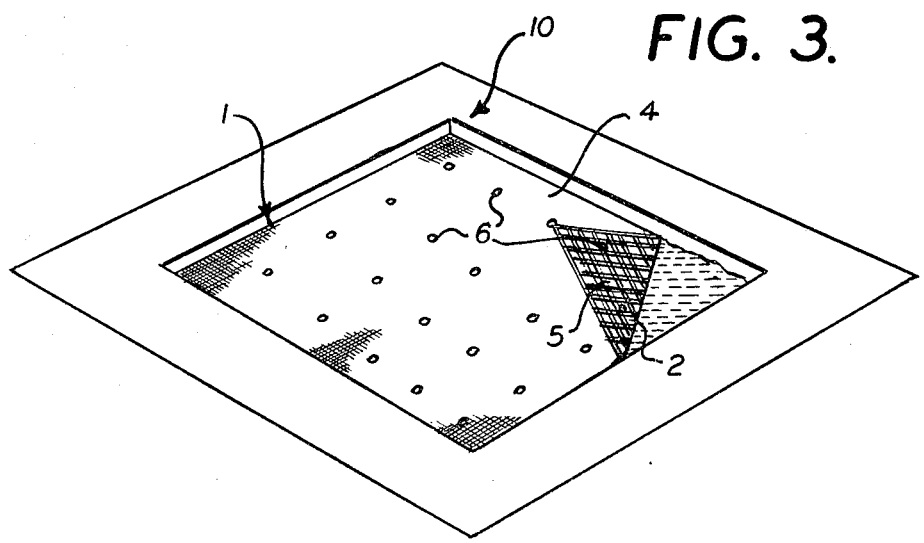
FIG. 3 shows the tarpaulin of FIG. 1 in use on a swimming pool.

FIG. 3 shows the tarpaulin covering 1 floating on the water of swimming pool 10.

It will be appreciated that the instant specification and claims are set forth by way of illustration and not limitation, and that various modifications and changes may be made without departing from the spirit and scope of the present invention.

What is claimed is:

1. A laminated tarpaulin with thermal insulation for a swimming pool, comprising a closed-cellularly foamed, elastic plastic inner layer with flotation features, a top layer of porous material and a bottom layer of an impenetrable, flexible material; and wherein the top layer is woven of a polyolefin, the inner layer is foamed polyethylene with a thickness of about 3 to 15 mm and the bottom layer is a polyolefin with a thickness of about 30 to 100 microns, the bottom layer and the bottom of the inner layer having a waffle-like embossment; said tarpaulin in combination with a swimming pool for covering the water therein.

2. A tarpaulin and swimming pool combination according to claim 1, wherein the top layer weighs from about 70 to 150 g/m$^2$.